(12) United States Patent
Dolinina

(10) Patent No.: US 9,959,200 B2
(45) Date of Patent: May 1, 2018

(54) USER INTERFACE FOR COMPOSING TEST SCENARIOS

(75) Inventor: Elena Dolinina, Emek Ayalon (IL)

(73) Assignee: Red Hat Israel, Ltd., Raanana (IL)

( * ) Notice: Subject to any disclaimer, the term of this patent is extended or adjusted under 35 U.S.C. 154(b) by 575 days.

(21) Appl. No.: 13/605,244

(22) Filed: Sep. 6, 2012

(65) Prior Publication Data

US 2014/0068410 A1 Mar. 6, 2014

(51) Int. Cl.
*G06F 11/36* (2006.01)
*G06F 9/455* (2018.01)

(52) U.S. Cl.
CPC .......... *G06F 11/3684* (2013.01); *G06F 9/455* (2013.01)

(58) Field of Classification Search
CPC ................................ G06F 9/455; G06F 17/246
USPC ........................................................ 715/255
See application file for complete search history.

(56) References Cited

U.S. PATENT DOCUMENTS

| | | |
|---|---|---|
| 7,421,621 B1 | 9/2008 | Zambrana |
| 8,464,219 B1 | 6/2013 | Wilkerson |
| 8,719,788 B2 | 5/2014 | Merry |
| 2002/0162059 A1 | 10/2002 | McNeely et al. |
| 2003/0140138 A1* | 7/2003 | Dygon ................ G06F 11/3688 709/224 |
| 2004/0107415 A1 | 6/2004 | Melamed et al. |
| 2004/0243381 A1 | 9/2004 | Kuturianu et al. |
| 2004/0260982 A1 | 12/2004 | Bhowmik et al. |
| 2005/0188262 A1 | 8/2005 | Rosenman et al. |
| 2006/0080638 A1* | 4/2006 | Fiore ......................... G06F 8/71 717/104 |
| 2007/0061625 A1 | 3/2007 | Acosta et al. |
| 2008/0120521 A1 | 5/2008 | Poisson et al. |
| 2010/0100591 A1* | 4/2010 | Mahaffey ................ G06F 15/16 709/204 |
| 2010/0100872 A1 | 4/2010 | Mitra |
| 2011/0307860 A1 | 12/2011 | Park et al. |
| 2013/0042222 A1* | 2/2013 | Maddela ......................... 717/124 |
| 2013/0086558 A1 | 4/2013 | Merino et al. |
| 2014/0033177 A1 | 1/2014 | Chang et al. |
| 2014/0059385 A1 | 2/2014 | Dolinsky et al. |

OTHER PUBLICATIONS

Greenfield et al., Software Factories: Assembling Applications with Patterns, Models, Frameworks and Tools, OOPSLA 2003, p. 16-27.*
Office Action for U.S. Appl. No. 13/606,984 dated May 7, 2014.
Office Action for U.S. Appl. No. 13/606,984 dated Aug. 15, 2014.
Advisory Action for U.S. Appl. No. 13/606,984 dated Oct. 17, 2014.
Office Action for U.S. Appl. No. 13/606,984 dated Dec. 9, 2014.

* cited by examiner

*Primary Examiner* — Andrew T McIntosh
(74) *Attorney, Agent, or Firm* — Lowenstein Sandler LLP

(57) ABSTRACT

A graphical user interface allows a user with little or no knowledge of XML to compose and manage automated tests for a target testing platform and testing framework. An example system opens an XML file storing test parameters and converts the test parameters to fields in a graphical user interface for presentation to a user. The system receives, from the user, input via the graphical user interface to modify the test parameters to yield modified test parameters, and outputs the modified test parameters, in XML format, for use with a testing framework which is configured to perform automated tests on a target test platform based on the modified test parameters.

18 Claims, 10 Drawing Sheets

| # | Test name | Test action | Parameters | Positive | Run | Report |
|---|---|---|---|---|---|---|
| 1 | Create Data Center NFS | addDataCenter | name={DataCenterTest,storage_type}=e{storage_type} | TRUE | if({data_center_type}==e{storage_type_nfs} | NO |
| 2 | Create Data Center iSCSI | addDataCenter | name={DataCenterTest,storage_type}=e{storage_type} | TRUE | if({data_center_type}==e{storage_type_iscsi} | YES |
| 3 | Create Cluster | addCluster | name={TestCluster,cpu={cpu_name},data_center=()} | TRUE | YES | NO |
| 4 | Add Host | addHost | host={vds},root_password={vds_password},cluster= | TRUE | YES | NO |
| 5 | iSCSI Discover | iscsiDiscover | host={vds},address={lun_address} | TRUE | if({data_center_type}==e{storage_type_iscsi} | NO |
| 6 | iSCSI Login | iscsiLogin | host={vds},address={lun_address},target={lun_tar} | TRUE | if({data_center_type}==e{storage_type_iscsi} | YES |
| 7 | Create Data Storage Domain iS | addStorageDomain | name={DataDomainTest,type=e{storage_dom_type_d} | TRUE | if({data_center_type}==e{storage_type_iscsi} | NO |
| 8 | Create Data Storage Domain NF | addStorageDomain | name={DataDomainTest,type=e{storage_dom_type_d} | TRUE | if({data_center_type}==e{storage_type_nfs} | YES |
| 9 | Attach Data Storage Domain to | attachStorageDomain | datacenter={DataCenterTest,storagedomain}=DataDo | TRUE | YES | NO |
| 10 | Create shared ISO domain | addStorageDomain | name={shared_iso_domain_name},type=e{storage_} | TRUE | YES | NO |
| 11 | Attach shared ISO Domain to Da | attachStorageDomain | datacenter=DataCenterTest,storagedomain={shared} | TRUE | YES | NO |
| 12 | Activate ISO Storage Domain | activateStorageDomain | datacenter=DataCenterTest,storagedomain={shared} | TRUE | YES | NO |

USER INTERFACE FOR COMPOSING TEST SCENARIOS

TECHNICAL FIELD

Embodiments of the present invention relate to composing test scenarios, and more specifically to a graphical user interface for users to compose XML test scenarios without manually editing XML files.

BACKGROUND

Automated testing tools often take eXtensible Markup Language (XML) files as input to guide the automated testing. XML is a commonly used markup language that encodes information in a single human-readable and machine-readable format. However, even though XML is generally designed to be human-readable, many users are not familiar with the specific details of writing XML code. Thus, users who are not familiar with or conversant in XML are unable to quickly or easily create XML files for automated testing, or are completely unable to create such XML files.

Even users who are familiar with XML and who can author such XML files for automated testing purposes are prone to manually introducing flaws which are not detected until the XML file is supplied to an automated testing tool and the automated testing tool fails or throws an error. Such flaws can include typographical errors or logic deficiencies. Manual editing of XML files is also time consuming, leading to increased costs in configuring and running automated tests, or leading to reduced automated test coverage.

BRIEF DESCRIPTION OF THE DRAWINGS

The present invention is illustrated by way of example, and not by way of limitation, in the figures of the accompanying drawings and in which:

FIG. 4 illustrates an example main user interface for a test composer.

FIG. 5 illustrates an example user interface for selecting an action in the test composer.

FIG. 6 illustrates an example user interface showing pagination and a move menu for the test composer.

DETAILED DESCRIPTION

Described herein is a system, a method and apparatus for providing a user interface for simple and accurate creation and management of automated tests. Users can create, edit, and otherwise manage parts of automated testing suites via a graphical user interface instead of manually creating or editing an XML or other type of automated testing input file. The typical automated test platform accepts very specific input providing details of what types of tests to run, what input data to use, which commands to execute, an order of commands, and any other testing parameters. The input to the automated test platform may also specify which testing outputs to track for logging purposes. A test composer allows users who may be unfamiliar with the specific automated test platform language, form, or commands to create and manage automated tests in a more familiar graphical environment and without knowledge of the language used to control the test platform, such as XML. Further, the graphical environment can provide suggestions, such as lists of available testing options, so that users can easily access functionality of the test platform. A graphical user interface approach to managing automated testing allows for increased efficiency and accuracy of testing, and makes automated testing accessible to a wider audience of users beyond those who are technically knowledgeable in the specific language and details of the test platform.

Figure 1:
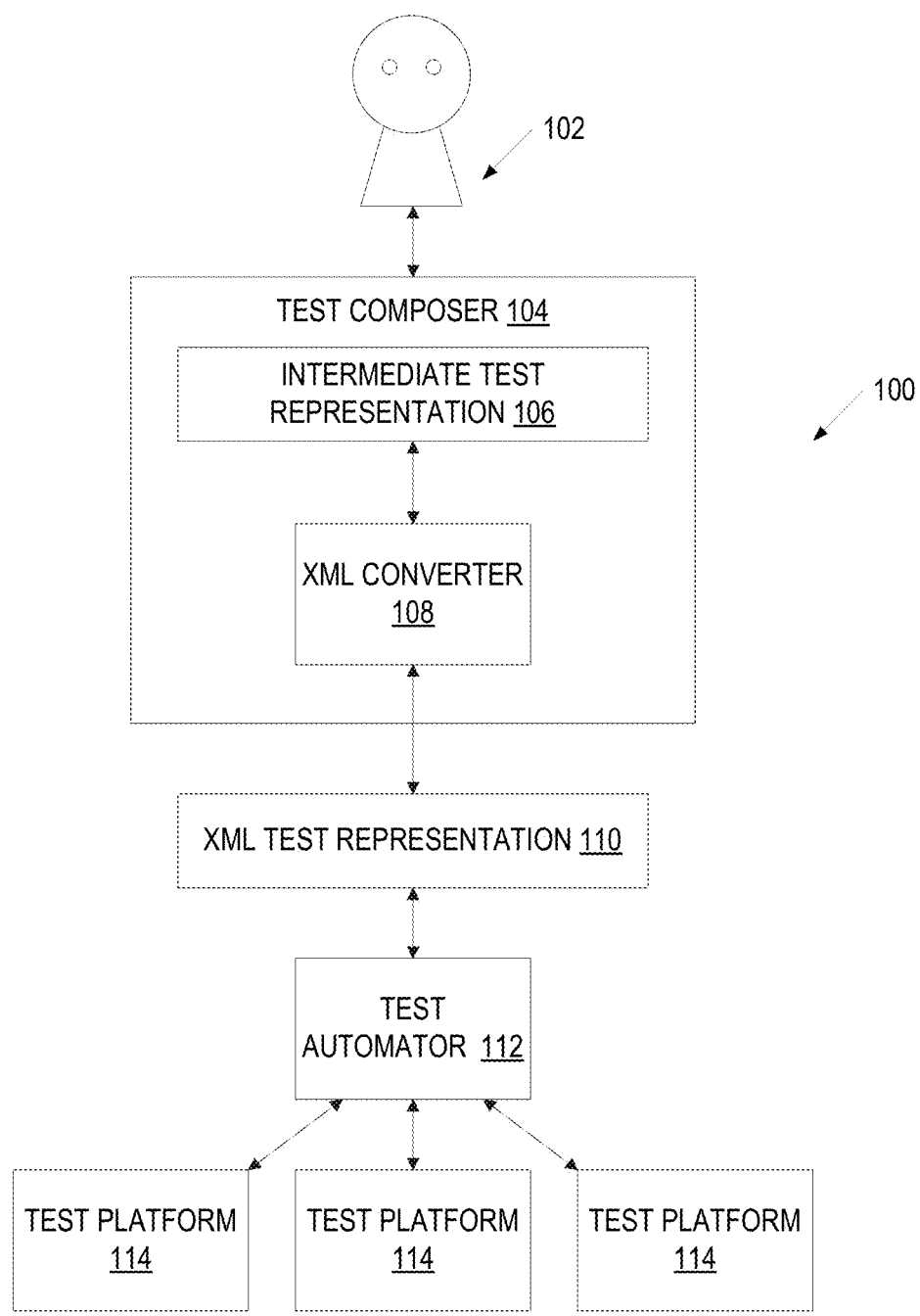
FIG. 1 illustrates a block diagram of an example architecture using a user interface to simplify automated testing.

FIG. 1 illustrates a block diagram of an example architecture 100 employing a graphical user interface to simplify automated testing. A user 102 accesses a test composer 104 via a graphical user interface. The test composer 104 can execute on a machine that is local to the user such as a desktop or a tablet computer, on a machine that is remote to the user such as a server in a data center, or some combination thereof such as a web server that serves a web page to a client browser and where the server and the client browser coordinate to provide functionality to the user. While the example embodiments disclosed herein illustrate graphical user interfaces, the user can interact with the test composer 104 via other interfaces as well, such as touch-based input, voice input, multimodal input, or other input. In one embodiment, the test composer 104 allows multiple users to access the same data simultaneously or at different times.

The user 102 provides input to the test composer 104, which the test composer 104 can store as an intermediate test representation 106. The user can provide input via a graphical user interface. In one example, the graphical user interface is a set of buttons, check boxes, and other user interface widgets. In another example, the graphical user interface is a spreadsheet in which a user selects a cell and enters text in to that cell for a particular attribute or feature of a particular test. Alternatively, the user can provide input by selecting a saved file to import. The intermediate test representation 106 can be a local file, a collection of entries in a database, an XML file, or other data format for example. The intermediate test representation 106 can allow the test composer 104 to store test settings provided by the user 102 for later retrieval or use. The test composer 104 can incorporate or communicate with an XML converter 108 that converts the intermediate test representation 106 to an XML test representation 110. The XML test representation 110 is an XML file configured to control the test automator 112 to perform the tests on the target test platform 114. While this example architecture 100 illustrates an XML converter 108, the test composer 104 can use the same intermediate test representation 106 with other converters for different target test platforms that use input file formats other than XML or that use differently formed XML. While the test automator 112 is illustrated as being separate from the test composer 104, the two can be incorporated together.

The test automator 112 can export the tests in different formats for different types of test platform 114. For example, one test platform can be a virtual machine running in a virtualization environment with corresponding physical or virtual storage devices, another test platform is a non-virtual computing device, and another test platform can include multiple computing devices. The test automator 112 can communicate with the various test platforms directly, such as via a virtualization environment manager, or via a network. The test automator 112 can be integrated with the various test platforms or their associated virtualization environments. Alternately, the test automator 112 can be a separate hardware component or software component or combination thereof that communicates with or controls the various test platforms.

In one example, the test automator 112 runs tests that span multiple different test platforms 114, such as for testing cross-platform communications or interactions. The test automator 112 can cause two or more test platforms 114 to run different portions of a test generated by the test composer 104 at the same time or in a specific sequence in order to trigger specific inter-platform interactions.

Figure 2:
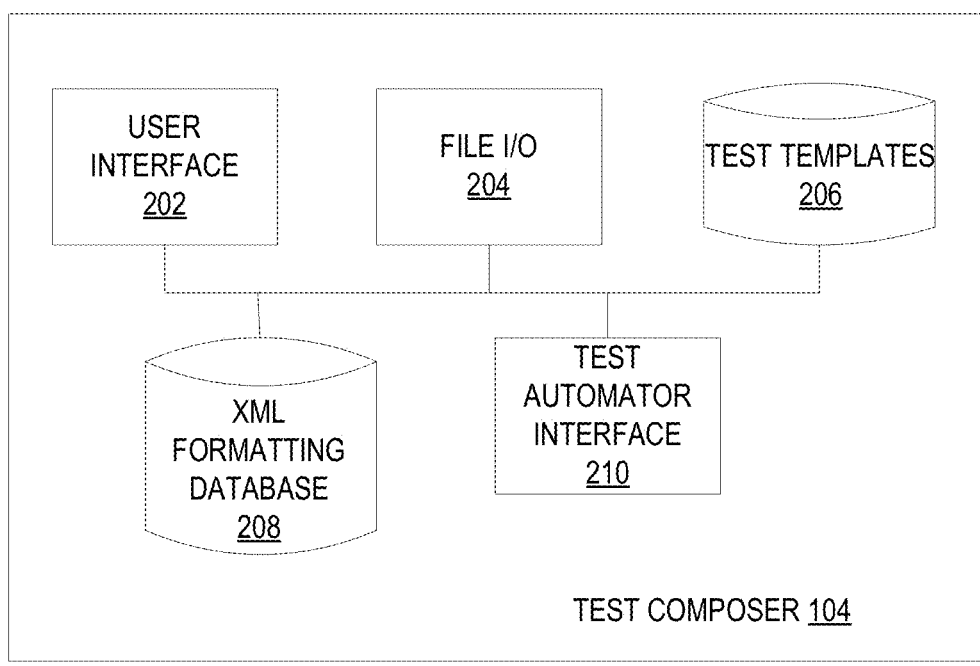
FIG. 2 illustrates a block diagram of an example architecture for a test composer.

FIG. 2 illustrates a block diagram of an example embodiment of the test composer 104. The test composer 104 includes a user interface 202, such as a graphical user interface in which the user provides keyboard and mouse input, or a voice interface in which the user provides spoken input. The test composer 104 includes a file I/O module 204 for retrieving and storing files, such as files that contain the intermediate test representations 106, or other configuration or preferences files for the test composer. The test composer 104 can store test templates 206. The test composer 104 can use test templates 206 to populate tests in the user interface 202 using common settings or common lists of available options. The test composer 104 can further include an XML formatting database 208 that specifies XML formats for target test platforms. The test composer 104 can also include a test automator interface 210 for communicating with test platforms directly or for communicating with a test automator which performs tests on the test platform. The test automator interface 210 can communicate with test platforms such as by sending commands to the test platform via a network connection, by sending XML files to the test platform, or by publishing commands for a test platform on a test feed. The test automator interface 210 can communicate with different test platforms using different protocols or different communication channels.

Figure 3:
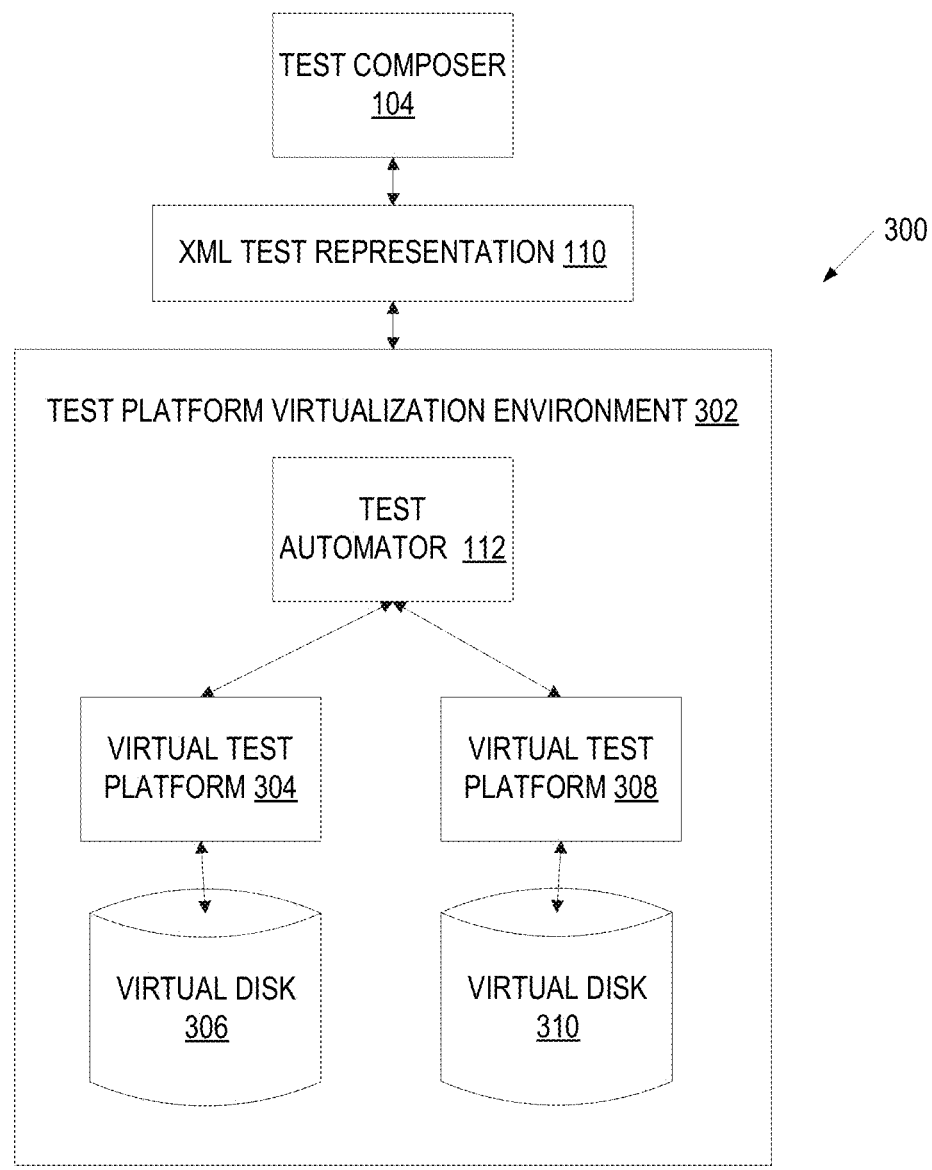
FIG. 3 illustrates a block diagram of an example architecture for a test platform virtualization environment.

FIG. 3 illustrates a block diagram of an example architecture 300 for a test platform virtualization environment 302. The test platform virtualization environment can be incorporated as part of a data center, such as a host running a virtual machine. A data center can include multiple computing devices each of which can communicate with storage devices or other computing devices, and which can participate in computing tasks. The test platform virtualization environment 302 can include one or more such computing device as part of a data center or logical cluster of devices within a data center. For example, the virtual test platform 304 can be a computing device running an instance of a virtualization application that, in turn, runs a virtual machine for testing.

A user interacts with the test composer 104 to produce an XML representation 110 of a test, which is passed to the test automator 112. The test automator 112 is depicted as being integrated with the test platform virtualization environment 302, but can be a separate component, or can be integrated within each virtual test platform, for example. The test automator 112 interacts with target virtual test platforms 304, 308, each of which may have its own physical or virtual disk 306, 310. The test automator 112 or the test platform virtualization environment 302 can load and run the various virtual test platforms 304, 308, or can interact with virtual test platforms 304, 308 that are already running. The test automator 112 can parse the XML representation 110 to determine which tests are intended for which target virtual test platforms. The XML representation can indicate a specific type of virtual test platform, or a set of acceptable target platforms. For example, the XML representation can indicate a specific operating system version for a virtual machine or for multiple virtual machines in which the tests will be performed, a specific CPU instruction set to be emulated in the virtual test platform, and so forth. In another embodiment, the XML representation 110 can indicate a range of Linux kernel versions that are acceptable for ?, a range of acceptable CPU families to be emulated, a range of available memory, and so forth. These differences may be based on cost or time required to execute the test, specific test parameters, or other factors. Some tests have more flexible target virtual test platform requirements than others.

FIG. 4 illustrates an example main user interface 400 for the test composer 104. The test composer 104 can build a tests matrix based on a testing framework. The test composer 104 can start with an XML file or some other previously generated file. A user can use his or her own XML file or start with a non-XML template file. The user can upload or select the appropriate file in the test composer interface via an 'Upload File' button 402. The test composer 104 loads the information from the uploaded file into the user interface, which is depicted here as a set of rows and columns. Each row represents an individual test to perform on the test platform, and each column represents a variable or setting for a respective individual test. The example columns include a 'test name' column 406, a 'parameters' column 410, a 'positive' column 412, a 'run' column 414 indicating whether the individual test should be performed, a 'test action' column 408 showing the exact command that will be executed to perform the test, and a 'report' column 416 indicating whether to report the outcome of the test. These columns are examples. The test composer 104 can incorporate all or part of these columns as well as other types of information relevant to running a test. The field names associated with the columns in the graphical user interface of the test composer 104 are configurable and can be consistent with the XML tag names in the loaded file. The 'positive' column 412 and the 'report' column 416 can be stored as flags in the XML file or in the intermediate representation.

After the file is opened and loaded into the interface, the user can extend, modify, or update the file within the user interface provided with the test composer, as explained below. The user can use the keyboard to enter information in the user interface for certain types of columns, such as the parameters column, can select from a set of available options, such as via a pull-down list or other contextual menu in the test action column, or can select by checking a check box for columns having two states, such as the positive column or the report column. After the test scenario is ready, the user can save the file with 'Save' button 404. The test composer 104 can save the file in XML format or in some other intermediate file format. The XML file can then be passed as an input file to a testing framework for executing the tests on the target test platform.

In one example, the first column of the test composer interface 104 shows a test name 'Create Data Center NFS', a test action 'addDataCenter', and parameters 'name='DataCenterTest', storage_type='e{storage_type}'.' This portion of an example XML test representation 110 would instruct the virtual test platform 308, for instance, to create a new Data Center with the provided parameters within the virtual disk 310 or as a completely new virtual disk. Data Center may include clusters of computing devices where each cluster can be a group of computing devices which are connected via one or more networks, and which can cooperate to perform computing tasks. A user can access all or part of a cluster as a single entity without accessing individual computing devices that make up the cluster. Clusters can be administered or controlled via a master computing node, or can include computing devices which are peers without such a master computing node. Each computing device may be a host machine running one or more virtual machines. Data Center may also include multiple storage domains. A storage domain is a set of storage devices available to a specific cluster. The storage domain can include local disks of various computing devices, as well as a dedicated storage device, such as a network attached storage (NAS) device.

The test action 'addDataCenter' can be a generic instruction for the target virtual test platform 308, but can be a platform-specific instruction. An example XML representation of this information is provided below:

```
<test>
    <test_name>Create Data Center NFS</test_name>
    <test_action>addDataCenter</test_action>
    <parameters>
        <name>DataCenterTest</name>
        <storage_type>e{storage_type}</storage_type>
        ... other parameters ...
    </parameters>
</test>
```

Other virtual machine tests can include instructions to create, initialize, suspend, or delete a virtual machine, as well as specific interactions with an executing virtual machine, whether by simulated user input via a keyboard, mouse, or other input device, or by simulated or actual network communications with the virtual machine. The tests can include console commands, for example, to execute a particular program, set of programs, utilities, or other commands on the virtual test platform.

The test composer 104 can provide for several different operations related to creating and updating test scenario files. For example, the user can upload a template file from a testing framework folder or some other file. The user can export or save test composer content to an XML file. The test composer 104 can prompt the user to save the file in a local or network based storage, such as on a server in the provided location. The user can also insert a row or column to the test scenario depicted in the test composer 104. When adding a column, for example, the user can enter or edit a column header name. The test composer 104 can update the format of the column and data in the column based on a column type indicated by the name or selected by the user. The user can duplicate one or more selected rows or columns, or one or more individual cells. The user can move rows up and down, to rearrange the order in which the tests will be performed. The user can delete rows or columns. The user can also select a maximum number of rows to display per page. The user can resize columns and rows. Many operations and interactions which are associated with spreadsheets can be applied to the user interface of the test composer 104.

The user interface of the test composer 104 can provide tips for assisting users to understand how to input data for controlling tests. For example, when a user clicks on a column header, the user interface can display a wiki or other resource which describes the meaning and possible syntax for data entered in fields under the column. As another example, when a user selects a desired action and hovers the mouse cursor over it, the user interface can display the full documentation supplied with this action, if it exists. When hovering the cursor over a cell, the user interface can display the full cell content, which can be useful when the input text is very long and the cell length is too short to view its full content.

The test composer can provide auto-complete for certain fields. For example, in the run column 414, a user can enter the first character or first few characters of a command, such as 'i' for 'if', 'l' for 'loop', 'y' for 'yes', 'n' for 'no'. Then the system can display all possible values supported for this statement that start with that character, and the user can select from one of the possible values.

Figure 5:
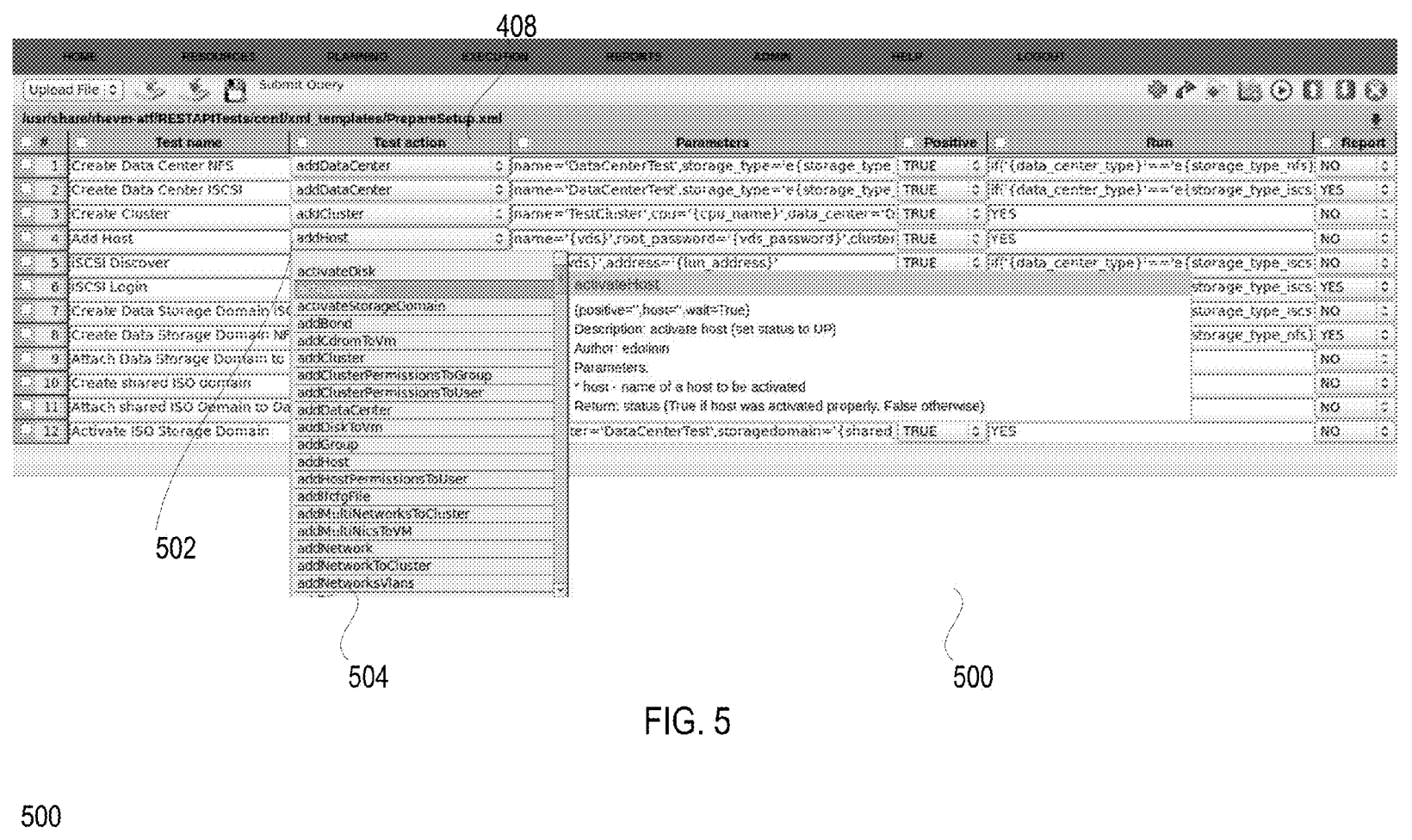

FIG. 5 illustrates an example user interface 500 for selecting an action in the test composer 104. In the test action column 408, the user can click on a cell 502. The user interface can present a pop-up menu 504 of available options from which the user can select. In FIG. 5, some example options for the 'Test Action' column include activateDisk, activateStorageDomain, addCluster, and so forth. The set of options presented to the user may be different for tests on virtual machine and on non-virtual machines. If the user interface is aware that the test is intended for a virtual machine, the user interface can adjust which available options are displayed so that only options that are compatible with testing on virtual machines are presented. The pop-up menu 504 can sort the available options alphabetically, by order of most recently used, by most often selected, or by some other order. When the user selects a particular option from the pop-up menu 504, the test composer 104 can update the remaining cells for that row based on the selected option. In an embodiment, when the user selects a particular action from the list, a description of the selected action is presented to the user (e.g., a description of the action's purpose, received parameters, the meaning of the received parameters, etc.) to enable the user to understand the scope and nature of the selected action.

Figure 6:
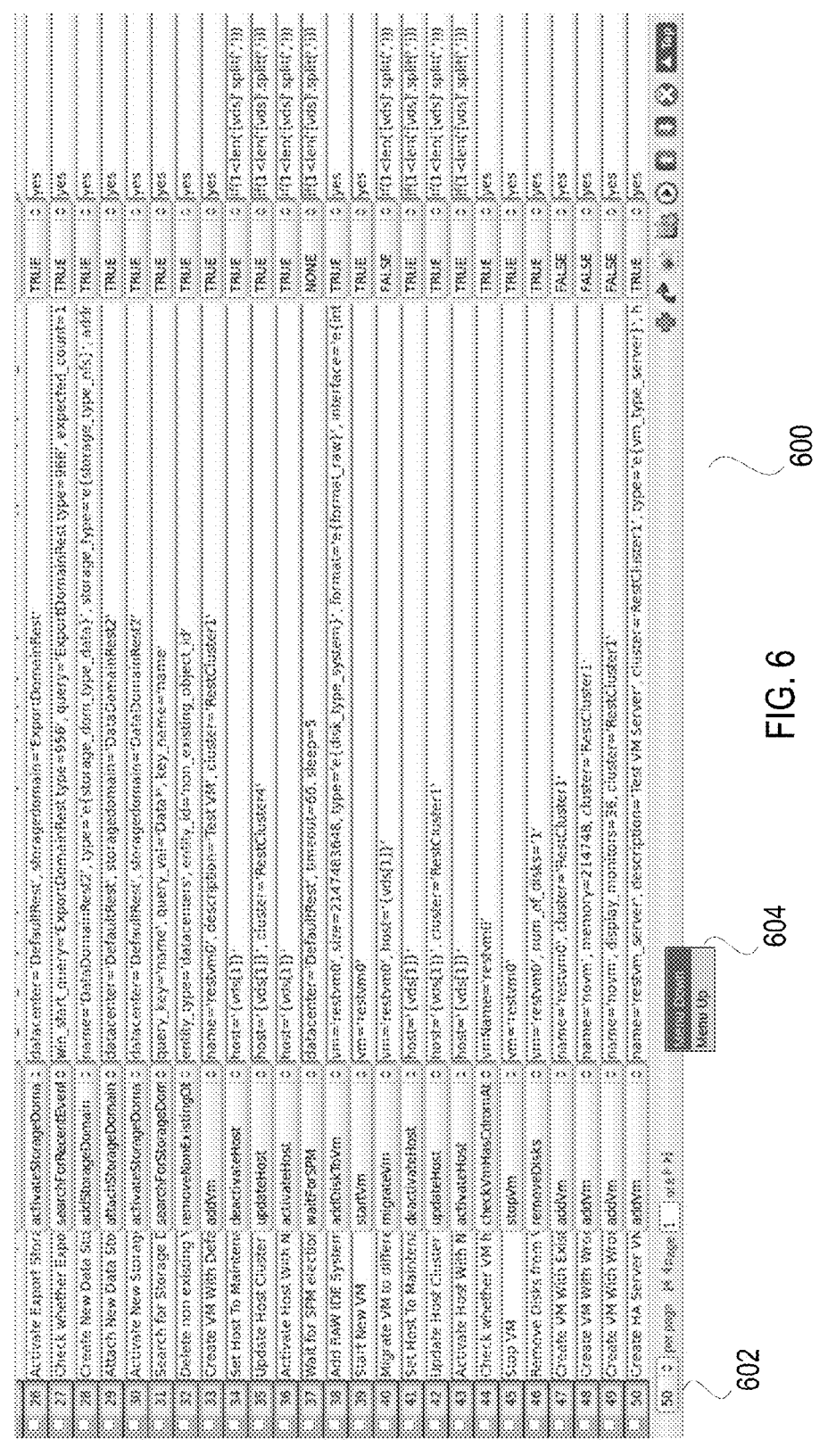

FIG. 6 illustrates an example user interface 600 showing pagination and a move menu for the test composer 104. The user interface 600 can include an option 602 for the user to select how many rows to display, each row representing an individual test to perform on the target test platform. The user interface 600 can also include buttons 604 to move a selected row up or down to change the order of performing the tests. In this example, the series of actions in each row is a test for executing on a virtual machine. The first row has an action type of activateStorageDomain and corresponding parameters, which cause the virtual machine to select and activate a specific storage domain. The second row has an action type of searchForRecentEvents and corresponding parameters, the third row has an action type of addStorageDomain and corresponding parameters, and so forth. The virtual machine executes each of the actions in order according to the parameters. The user interface can allow a user to combine several actions into an action group which can be manipulated as a unit, such as moving the entire action group at the same time or modifying parameters of individual actions in the action group collectively. Further, the user interface can allow the user to title action groups, and collapse action groups so that only the title is displayed. For example, mounting a virtual disk may require five discrete actions. Those five actions can be combined into an action group, and the user can title those five actions "mount virtual disk" in the user interface. Then when the user collapses the action group, the user interface displays "mount virtual disk" instead of the five separate actions. Users can also copy, cut, and paste actions or action groups within the user interface.

Figure 7:
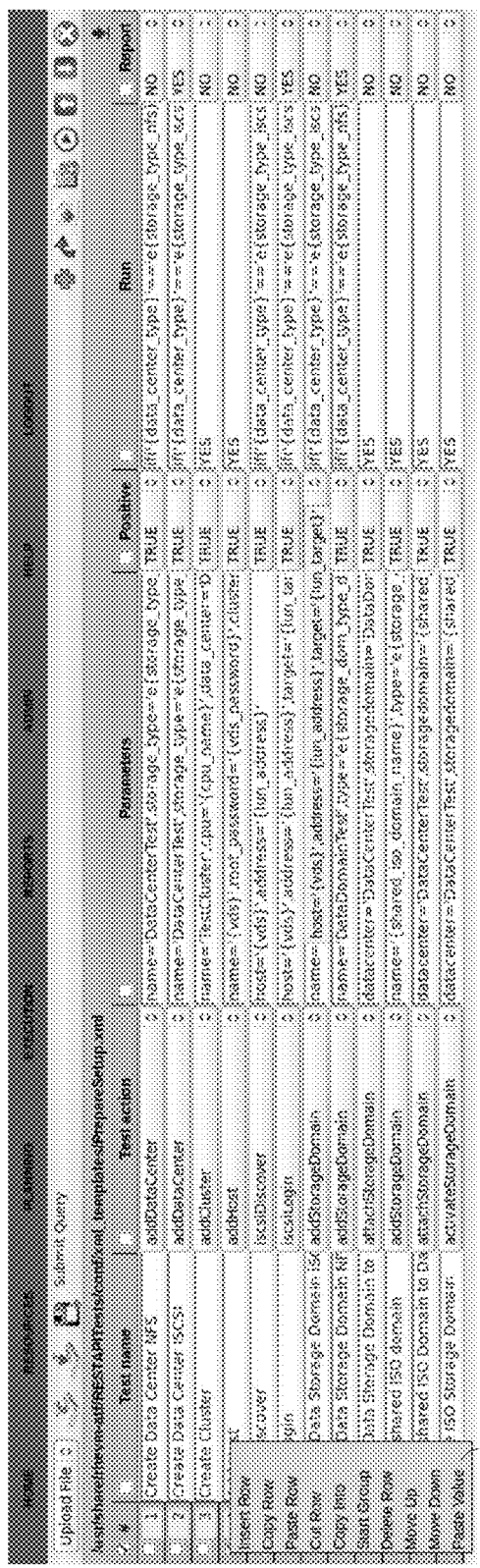
FIG. 7 illustrates an example user interface with a contextual pop-up menu for the test composer.

FIG. 7 illustrates an example user interface 700 with a contextual pop-up menu 702 for the test composer 104. A user can right-click on a cell or other part of the user interface 700 to view the contextual pop-up menu 702. The contents of the contextual pop-up menu 702 can vary based on where the user clicks to view the menu. For example, if the user clicks on a row label, then the pop-up menu can display options for manipulating a row, such as 'insert row', 'copy row', or 'delete row.'

Figure 8:
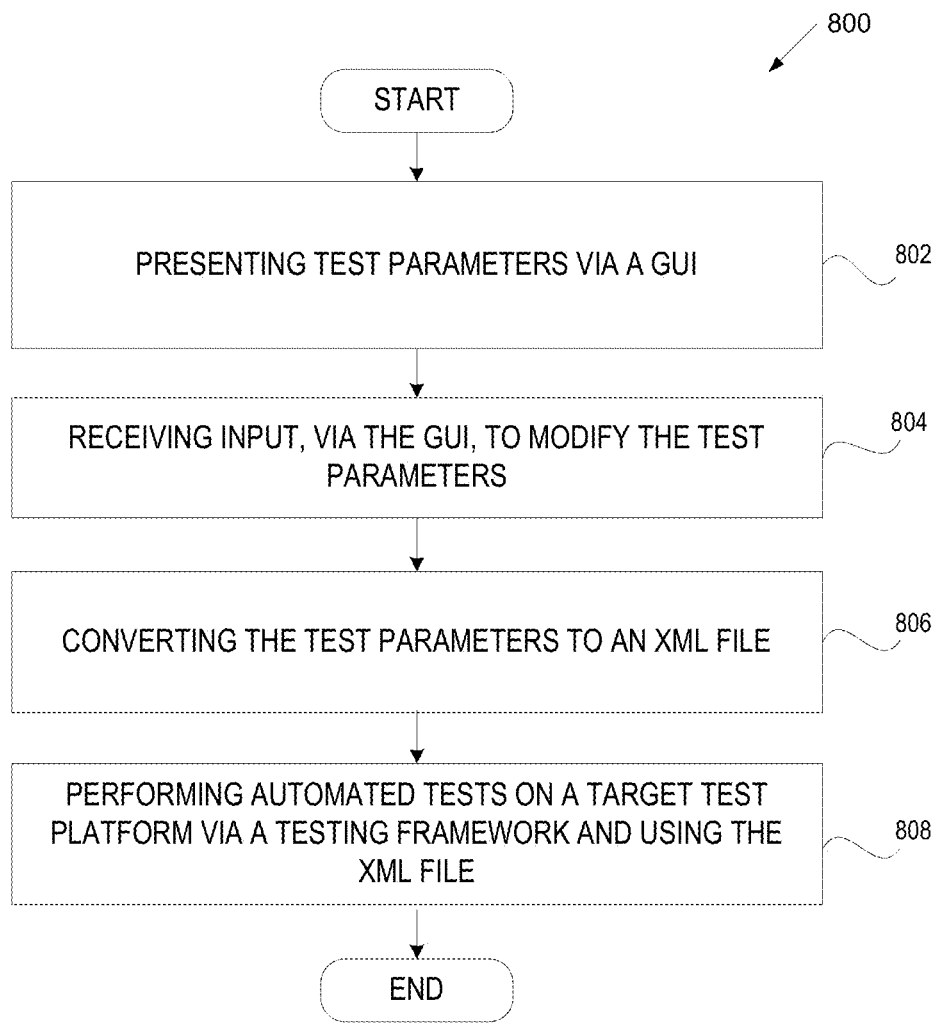
FIG. 8 illustrates a first example flow diagram of one embodiment of a method for performing automated tests based on test parameters received via a graphical user interface.

FIG. 8 illustrates a first example flow diagram 800 of one embodiment of a method for performing automated tests based on test parameters received via a graphical user interface. A system configured to practice the method presents to a user test parameters via a graphical user interface (802). The graphical user interface can be a set of rows and columns, such as a spreadsheet. The test parameters can be default values, or can be imported from a file. Test parameters can include a test name, a test action, parameters, a run flag, or a report flag. XML data associated with the test parameters can also include metadata describing a test version, test compatibility information, XML file format compatibility information, authorship information, security information, user permissions, and so forth.

The system receives, from the user, input to modify the test parameters (804). For example, the user can modify the order in which that tests are performed, can modify test types, example data sets for use with the tests, or whether a report is generated for the test. The system generates a file, such as an XML file, representing the test parameters (806). The system can then run automated tests on a target test platform using the file (808). The automated tests can be run on the target test platform by transmitting the file to a testing framework which interfaces directly with the target test platform to perform the automated tests. The target test platform can be a virtual machine, in which case the testing framework can be integrated with the virtual environment. For example, the virtual environment can be a virtual machine platform such as Virtualbox, QEMU, VMWare Workstation, a Xen virtual machine, a Kernel Virtual Machine (KVM), or others. Alternatively, the testing framework can be a wrapper around the virtual environment, or a module that controls all or part of the virtual environment to cause the virtual machines running in the virtual environment to perform specific actions according to the test.

Figure 9:
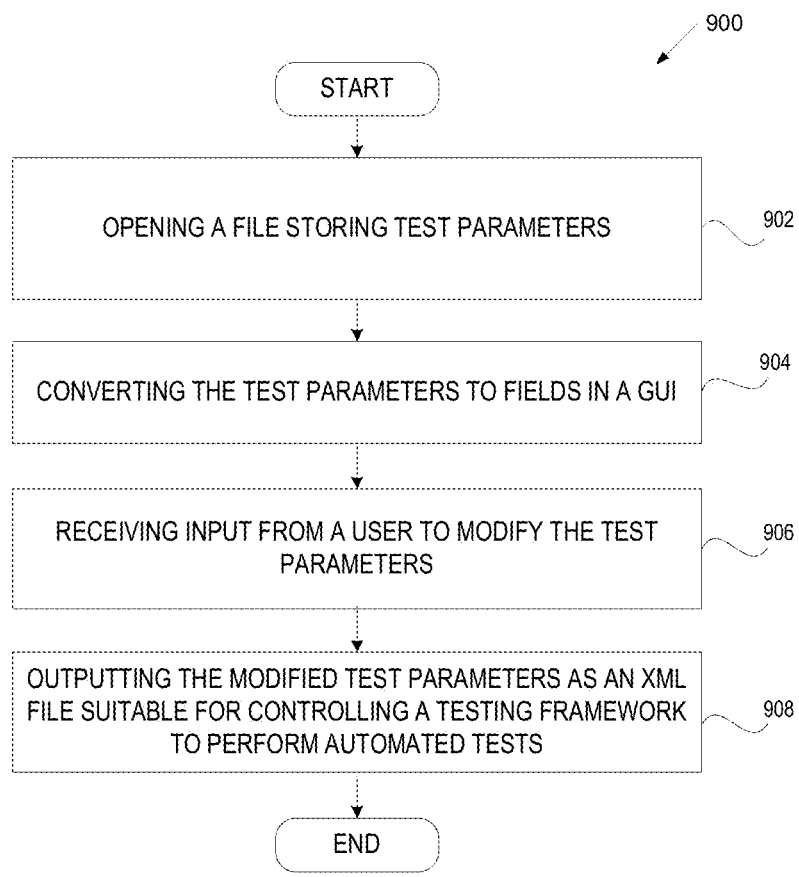
FIG. 9 illustrates a second example flow diagram of one embodiment of a method for opening a file storing test parameters in a graphical user interface, and outputting modified test parameters.

FIG. 9 illustrates a second example flow diagram 900 of one embodiment of a method for opening a file storing test parameters in a graphical user interface, and outputting modified test parameters. The system opens an eXtensible Markup Language (XML) file storing test parameters (902). The system converts the test parameters to fields in a graphical user interface (904) and presents the test parameters to a user via the graphical user interface. The system receives, from the user, input via the graphical user interface to modify the test parameters to yield modified test parameters (906). The user can edit the test parameters directly in the user interface without knowledge or use of XML, and the system automatically converts the input data to XML instructions for carrying out the tests indicated by the information provided through the user interface. In one variation for XML knowledgeable users, the user interface can provide a preview of the XML code that would be generated based on the information provided through the user interface. The preview of the XML code can be user-editable prior to its execution in the target test environment, in the case of users who are at least somewhat familiar with XML.

The system outputs the modified test parameters, in XML format, for use with a testing framework which is configured to perform automated tests on a target test platform based on the modified test parameters (908), such as by transmitting the modified test parameters in XML format to the testing framework. The format of the XML can be determined based on at least one of the testing framework or the target test platform. The system can output the same modified test parameters in different XML formats for different target test platforms or for different testing frameworks. The system can output the modified test parameters in the same file that was initially opened, or in a different file.

Figure 10:
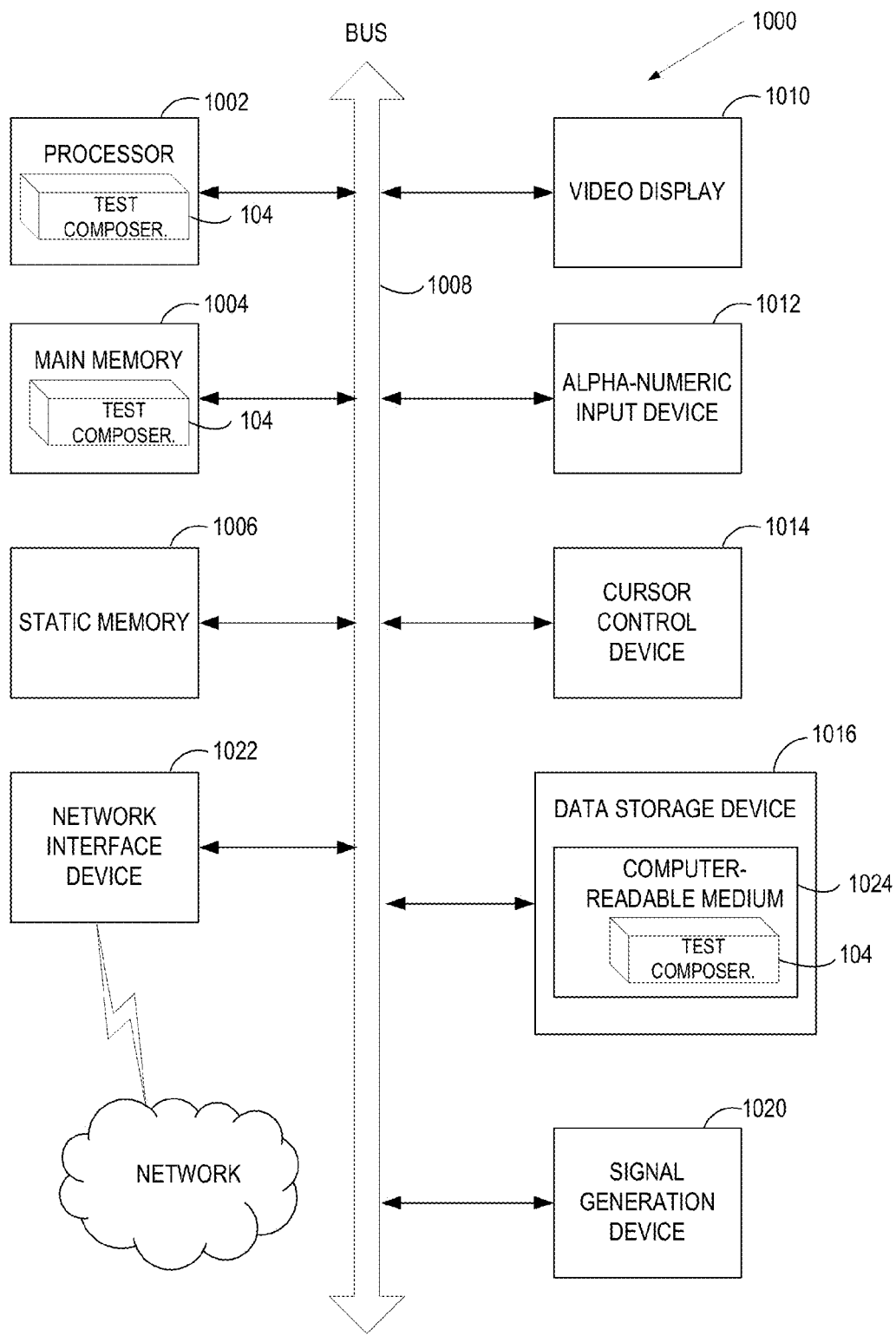
FIG. 10 illustrates a block diagram of an example computer system, in accordance with one embodiment of the present invention.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute processing logic (e.g., instructions for an test composer 104) for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), other user input device such as a touch screen or a microphone, and a signal generation device 1020 (e.g., a speaker).

The secondary memory 1018 may include a machine-readable storage medium (or more specifically a computer-readable storage medium) 1024 on which is stored one or more sets of instructions for the test composer 104 embodying any one or more of the methodologies or functions described herein. The instructions 1026 may also reside, completely or at least partially, within the main memory 1004 or within the processing device 1002 during execution thereof by the computer system 1000, the main memory 1004 and the processing device 1002 also constituting machine-readable storage media.

The computer-readable storage medium 1024 may also be used to store a problem resolution manager which may correspond to the test composer 104 of FIG. 1), or a software library containing methods that call a test composer 104. While the computer-readable storage medium 1024 is shown in an example embodiment to be a single medium, the term "computer-readable storage medium" should be taken to include a single medium or multiple media (e.g., a centralized or distributed database, or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   identifying test parameters of an automated test;
   presenting, by a processing device, the test parameters via a graphical user interface, wherein the test parameters are presented as user-editable elements in the graphical user interface;
   receiving input to modify the test parameters via the graphical user interface;
   generating, via the processing device, a plurality of different eXtensible Markup Language (XML) files each representing the test parameters in a different format corresponding to each of a plurality of target test platforms comprising a first target test platform and a second target test platform; and
   running a plurality of automated tests on the plurality of different target test platforms using the XML file in the different format corresponding to each of the plurality of target test platforms, wherein a first automated test of the plurality of automated tests checks cross-platform communication between the first target test platform and the second target test platform, and wherein the first target test platform and the second target test platform run different portions of the first automated test of the automated tests in a selected sequence further executing the cross-platform communication between the first target test platform and the second target test platform.

2. The method of claim 1, wherein the graphical user interface comprises a set of columns and a set of rows.

3. The method of claim 1, further comprising:
   receiving an indication of a file to open; and
   importing the test parameters from the file.

4. The method of claim 1, wherein the test parameters comprise at least one of a test name, a test action, parameters, a run flag, or a report flag.

5. The method of claim 3, wherein the file is an eXtensible Markup Language (XML) file formatted for the target test platform.

6. The method of claim 1, wherein running the automated tests on the target test platform further comprises transmitting the XML file to a testing framework which interfaces directly with the target test platform to perform the automated tests.

7. A system comprising:
   a memory comprising an eXtensible Markup Language (XML) file; and
   a processing device operatively coupled to the memory, the processing device to:
      open, by the processing device, the XML file storing test parameters;
      convert the test parameters to fields in a graphical user interface;
      present the test parameters via the graphical user interface;
      receive input via the graphical user interface to modify the test parameters to yield modified test parameters; and
      output the modified test parameters, in a plurality of different XML formats corresponding to each of a plurality of different target test platforms, to use with a testing framework to perform a plurality of automated tests on the plurality of different target test platforms comprising a first target test platform and a second target test platform in view of the modified test parameters, wherein a first automated test of the plurality of automated tests checks cross-platform communication between the first target test platform and the second target test platform run different portions of the first automated test of the automated tests in a selected sequence further executing the cross-platform communication between the first target test platform and the second target test platform.

8. The system of claim 7, wherein the graphical user interface comprises a spreadsheet.

9. The system of claim 7, the processing device to: transmit the modified test parameters in XML format to the testing framework.

10. The system of claim 7, the processing device to: determine the XML format in view of at least one of the testing framework or the target test platform.

11. The system of claim 7, wherein the test parameters comprise at least one of a test name, a test action, parameters, a run flag, or a report flag.

12. The system of claim 7, wherein the XML file is stored using the XML format.

13. The system of claim 7, wherein the modified test parameters are output via the XML file.

14. A non-transitory computer-readable storage medium having stored therein instructions which, when executed by a processing device, cause the processing device to:
- identify, by the processing device, test parameters of an automated test;
- present the test parameters via a graphical user interface, wherein the test parameters are presented as user-editable elements in the graphical user interface;
- receive, from the user, input to modify the test parameters;
- generate a plurality of different eXtensible Markup Language (XML) files each representing the test parameters in a different format corresponding to each of a plurality of target test platforms comprising a first target test platform and a second target test platform; and
- run a plurality of automated tests on the plurality of different target test platforms using the XML file in the different format corresponding to each of the plurality of target test platforms, wherein a first automated test of the plurality of automated tests checks cross-platform communication between the first target test platform and the second target test platform, and wherein the first target test platform and the second target test platform run different portions of the first automated test of the automated tests in a selected sequence further executing the cross-platform communication between the first target test platform and the second target test platform.

15. The non-transitory computer-readable storage medium of claim 14, wherein the graphical user interface comprises a set of columns and a set of rows.

16. The non-transitory computer-readable storage medium of claim 14, the processing device to:
- receive an indication of a file to open; and
- import the test parameters from the file.

17. The non-transitory computer-readable storage medium of claim 14, wherein the test parameters comprise at least one of a test name, a test action, parameters, a run flag, or a report flag.

18. The non-transitory computer-readable storage medium of claim 14, the processing device to transmit a first XML file to the testing framework which interfaces directly with a first target test platform of the plurality of different target test platforms to perform the automated tests.

* * * * *